April 14, 1959
A. J. WELCH
2,881,890
CONTROL MECHANISM
Filed March 5, 1956
3 Sheets-Sheet 1
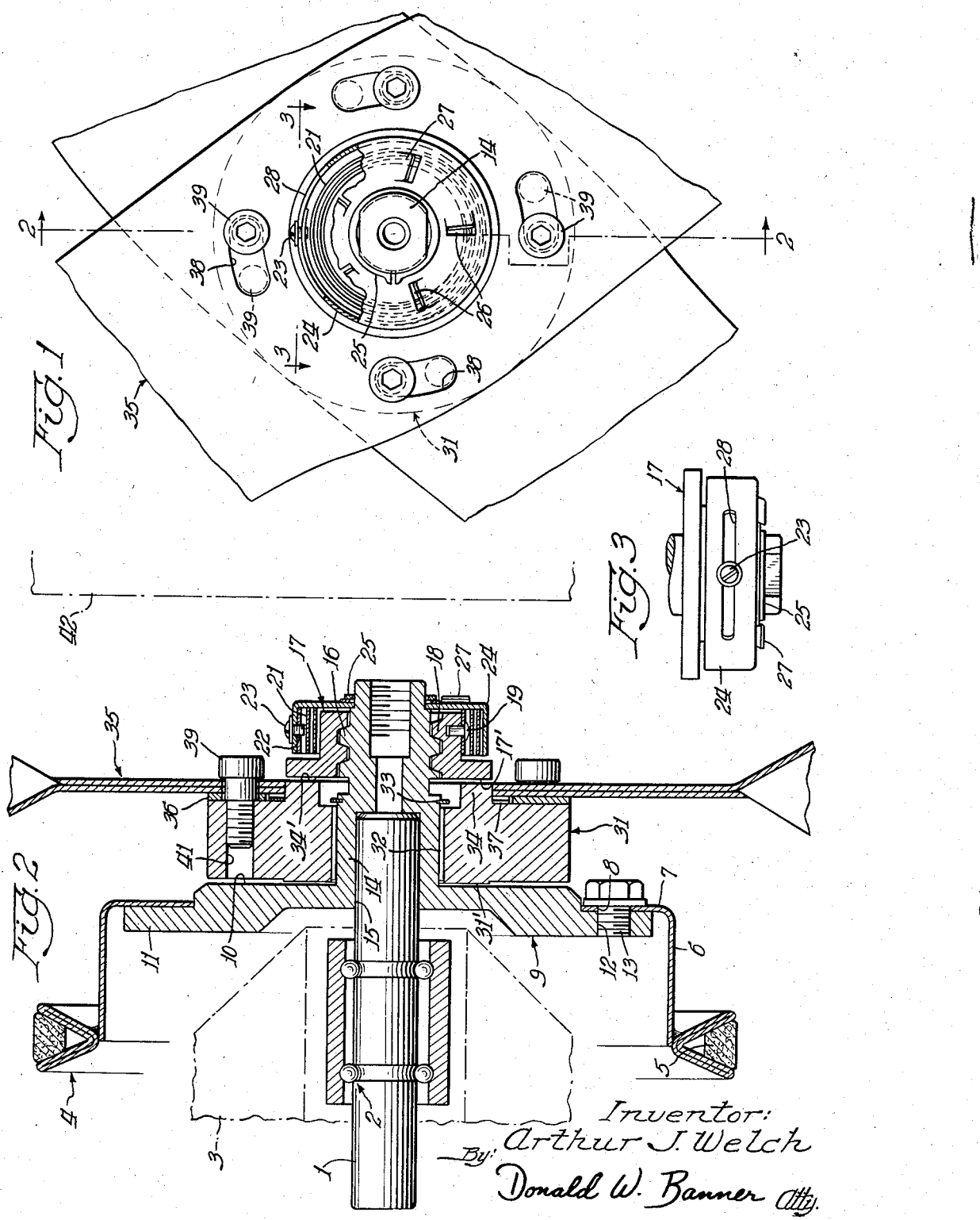
Inventor:
Arthur J. Welch
By: Donald W. Banner Atty.

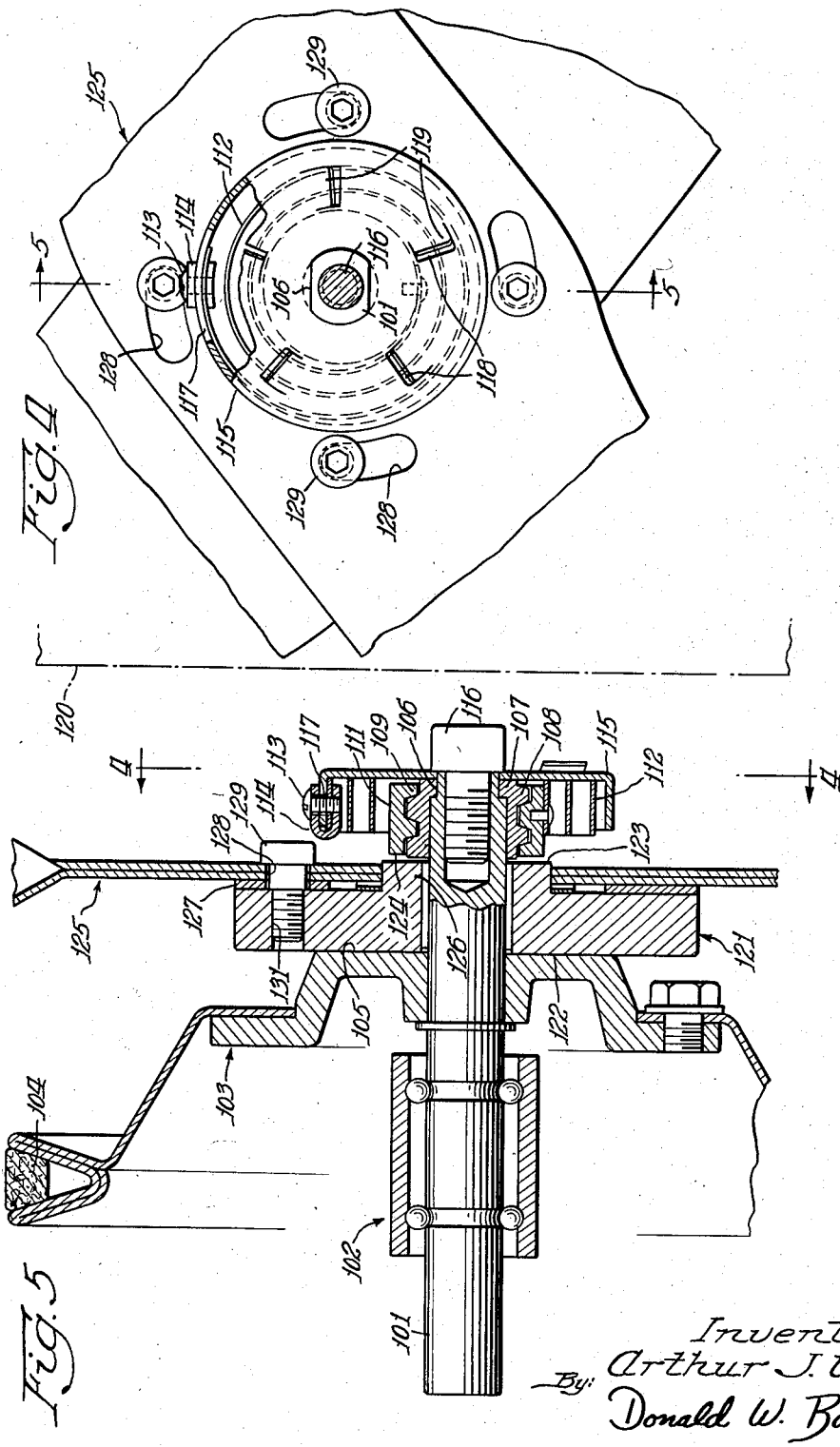

April 14, 1959 A. J. WELCH 2,881,890
CONTROL MECHANISM
Filed March 5, 1956 3 Sheets-Sheet 3
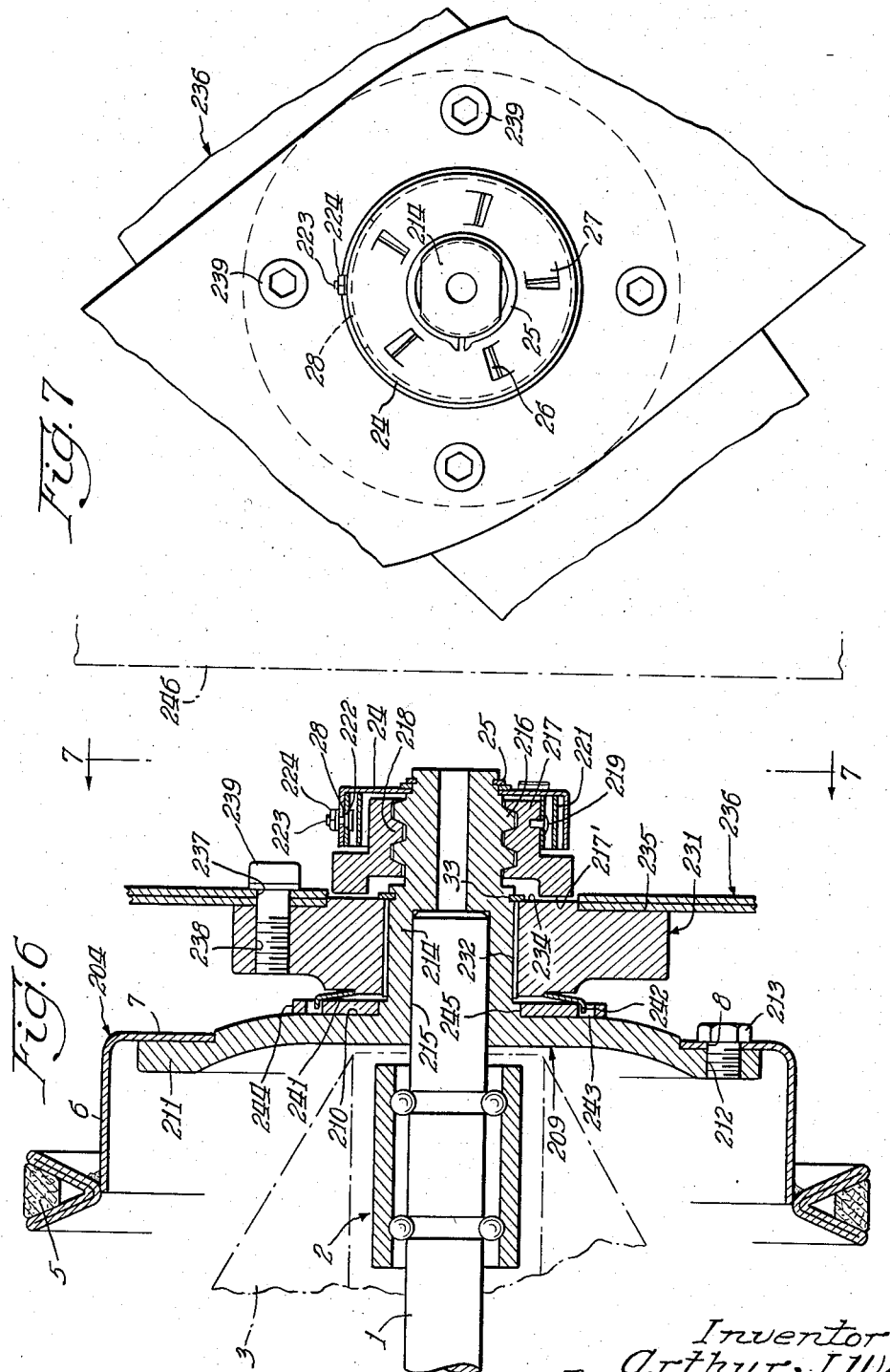

United States Patent Office 2,881,890
Patented Apr. 14, 1959

2,881,890
CONTROL MECHANISM
Arthur J. Welch, Oak Park, Ill., assignor to Borg-Warner Corporation, a corporation of Illinois
Application March 5, 1956, Serial No. 569,544
16 Claims. (Cl. 192—82)

This invention relates to a thermally responsive control mechanism, and more particularly to a thermally responsive control mechanism suitable for controlling the operation of a fan employed in an automotive vehicle.

The desirability of having suitable mechanism for effecting the connection and disconnection of an automotive vehicle fan to the source of driven power has long been recognized. A great many attempts have been made in the past to provide a suitable mechanism to drive the fan when it was needed, but disconnect the fan when it was not required. Most of such prior attempts have, to the best of my knowledge, been commercially unfeasible—except for a few special situations in which cost was not an important factor—because the mechanism was too expensive, functionally undependable or lacked adaptability to the varying circumstances under which automotive vehicles operate. Furthermore, most of these prior attempts to provide a desirable controlled fan mechanism require that extensive changes be made in other components of the vehicle in which the fan was to be disposed.

It is therefore one of the objects of the present invention to provide a new and improved control mechanism particularly suited to control the operation of a fan in automotive vehicles which overcomes the defects in the above discussed prior devices.

Another object is the provision of the device in accordance with the preceding object which is inexpensive, dependable, adjustable and which requires almost no modification whatsoever of the other components of modern automotive vehicles.

It is another object of the present invention to provide a new and improved fan control mechanism for automotive vehicles which comprises a unitary assembly which is readily attached to the conventional pump shaft employed in automotive vehicles the unitary assembly being attached to the pump shaft in exactly the same manner as now employed to effect the installation of the conventional fan assembly.

A further object of the present invention is the provision of a new and improved fan control mechanism of a highly simplified nature in which the operating characteristics thereof are readily adjustable without requiring the disassembly of the device.

Other objects and features of the invention will be readily apparent to those skilled in the art from the specification and appended drawings illustrating certain preferred embodiments in which:

Figure 1 is a front elevational view of a device incorporating the principles of the present invention, with parts broken away to facilitate the showing, illustrating the fan's operating condition;

Figure 2 is a sectional view along the plane of line 2—2 of Figure 1, taken when the fan is not operating;

Figure 3 is a partial end sectional view along the plane of line 3—3 of Figure 1;

Figure 4 is a front elevational view, with parts broken away to facilitate the showing of a modified form of the invention, illustrating the fan's operating condition;

Figure 5 is a sectional view along the plane of line 5—5 of Figure 4, taken when the fan is not operating;

Figure 6 is a side elevational view shown in section of a further modified form of the present invention;

Figure 7 is a view along the plane of line 7—7 of Figure 6.

Turning first to the preferred form of the invention as illustrated in Figures 1 to 3, there is illustrated a conventional pump shaft 1 conventionally journaled by bearing means 2 to the fixed housing 3. Pump shaft 1 is driven by means of a pulley member 4 which is rotated by a conventional fan belt 5, the latter being driven by the engine (not shown) of the vehicle in the usual manner. The pulley member 4 includes an integral cup shaped member 6 having a radially inwardly extending, circular portion 7, as shown in Figure 2. The portion 7 is provided with a plurality of circumferentially spaced openings 8 adapted to receive fastening means.

The inner surface of the portion 7 defines a generally circular opening through which extends a support member, indicated in general by the numeral 9, of cast iron, a phenolic resin, or other suitable material. The support member 9 has a central circular portion and a forwardly facing, radially extending surface 10. Member 9 is further provided with a plurality of outwardly projecting arms 11, disposed inwardly of the aforementioned circular opening defined by the inner surface of portion 7. The arms 11 are provided with suitable, threaded openings 12 therein which register with the openings 8 in the portion 7. Suitable studs 13 respectively extend through the openings 8 and threadably are engaged in the openings 12 so as to fix the member 9 to the portion 7.

As clearly illustrated in Figure 2, the support member 9 includes a forwardly projecting portion 14 having an opening 15 extending therethrough. The opening 15 is divided into three sections of different diameters; the innermost portion of the opening 15 is circular and is press-fit onto the end of pump shaft 1, the outermost end of the pump shaft abutting an internal wall defining the outer end of this innermost portion of the opening 15. The forward portion of opening 15 is threaded, and inserted therein is a suitably threaded stud.

As a result of the aforedescribed construction, the support member 9 and the pulley member 4 are fixed together; the support member 9, in addition, is fixed to the outer end of the pump shaft 1. It will therefore be seen that when the vehicle engine operates to drive the fan belt 5, the pulley member 4, the support member 9 and pump shaft 1 will rotate together.

The outermost end of support member 9 is provided with a plurality of external screw threads 16 which preferably are acme stub threads of 3 per inch. Mounted upon the outer end of the support member 9 is a nut 17 of steel, phenolic resin, or other suitable material having threads 18 complementary to—and associated with— the threads on the support member 9. The threads 16 and 18 are constructed and arranged to be "left hand" threads, and preferably are self-locking. The nut 17 is generally circular in outer configuration, and has a rearwardly facing, radially extending friction face 17'.

To the nut 17 there is fixedly attached, by means of a rivet 19, one end of a spirally wound bimetal 21. The opposite end of the bimetal 21 is provided with a threaded opening 22; cooperating with this opening is a stud 23 which serves to fix the bimetal 21, in a manner to be hereinafter described, to a cup shaped member 24. It should be noted that bimetal 21 projects forwardly— to the right in Figure 2—beyond the forward face of nut 17 and almost into engagement with cup 24, whereby locking of nut 17 at the most forward end of threads 16 is prevented. The outermost end of the support member 9 is provided with a non-circular exterior portion upon which the cup 24—which has a centrally disposed, complementary non-circular portion—is supported, the cup 24 rotating with the support member 9. The cup member 24 is maintained in position on the support member 9 by suitable washer-snap ring means 25. The front face of the cup 24 is provided with a plurality of spaced windows 26, respectively formed by shearing scoops 27 outwardly from the front face of the cup 24, the direction of the shearing being such that as the cup 24 is rotated with the support member 9, the scoops 27 will force air inwardly of the cup 24 and into engagement with bimetal 21.

It will be obvious that the degree of initial tension applied to the bimetal 21 is determined by the positioning of the ends thereof. Means are provided to vary this initial tensioning, for a purpose to be subsequently described, which include the aforementioned stud 23 and a slot 28 extending around approximately 60 degrees of the outer surface of the cup 24. In Figures 2 and 3 it will be seen that the stud 23 extends through this slot 28, and when loosened may be positioned as desired along the length of the slot 28 and subsequently retightened to fix the end of the bimetal associated therewith in any position along the length of the slot 28.

Carried by the support member 9 between the surface 10 thereof and the nut 17 thereon is a fan support member 31 which is generally cruciform in configuration and formed of aluminum, cast iron, or other suitable material. The member 31 has a rearwardly facing, radially extending surface 31′ as illustrated in Figure 2. (If desired, a belleville spring may be disposed on support member 9 between surface 31′ and surface 10.) The fan support member 31 is rotatably disposed about the support member 9 upon suitable nylon or needle bearings 32 and maintained against forward movement by means of a retainer ring 33. The member 31 has an annular, forwardly extending projection 34 which is provided with a forwardly facing, radially extending friction surface 34′. The radially outer surface of projection 34 extends through suitable circular openings in a pair of crossed fan blades together forming a fan blade assembly 35. To the inner surface of this fan blade assembly there is fixedly mounted, as by welding, a steel strengthener ring 36 having a plurality of spaced, circumferentially elongated slots therein. Disposed between the ring 36 and the projection 34 are a pair of washer means 37.

The fan blade assembly 35, as best illustrated in Figure 1, is provided with a plurality of spaced, circumferentially elongated slots 38—in registration with the slots in the ring 36—and extending through each of those slots is a stud 39, the inner end of which is received in one of a plurality of suitably threaded openings 41 in the fan support member 31. The studs 39, although preventing forward movement of the fan blade assembly 35, permit rotational movement thereof relative to the fan support member 31 to the degree determined by the length of the slots in the fan blade assembly 35 and strengthener ring 36.

When the device is disposed in an automobile, it is aligned with and immediately behind the rear face of the radiator of the vehicle, indicated by the numeral 42 in Figure 2. When the vehicle engine is operating the fan belt 5 will be continually driven so to effect constant, common rotation of pulley 4, support member 9, the pump shaft 1, cup 24 and nut 17. This rotation would conventionally be clockwise when viewed from the front, (the right end as illustrated in Figure 2). In the condition of the device illustrated in Figure 2, the fan support member 31 and the fan blade assembly 35 would rotate in the same general direction as the support member 9 because of the slight bearing drag between the support member 9 and the fan support member 31; with the vehicle moving forwardly (toward the right in Figure 2) the fan support member 31 and the fan blade assembly 35 would also tend to rotate in the clockwise direction with the support member 9 because the pitch of the fan blades is such that as the air moves rearwardly past these blades, clockwise motion thereof is induced. The fan support 31 and the fan blade assembly 35 are, however, merely "windmilling," and are not absorbing any significant amount of power from the engine, inasmuch as fan support member 31 is not fixedly connected with any of the elements being driven—directly or indirectly—by the engine.

With the vehicle moving forwardly, air will pass through the radiator 42 and increase in temperature in the conventional manner. Some of this heated air will be forced through the windows 26 of cup 24 by the scoops 27 and will engage the bimetal 21. The bimetal 21 is constructed and arranged such that upon sufficient increase in bimetal temperature the bimetal 21 will force rotation of the nut 17 in a counterclockwise direction to effect rearward (to the left in Figure 2) longitudinal movement thereof. Upon sufficient rearward movement of the nut 17 it will be seen that the surface 17′ on the nut 17 and the surface 34′ on the fan support member 31 will engage. Inasmuch as the fan support member 31 is rotating more slowly than the remainder of the assembly when the surface 17′ and 34′ are brought into frictional engagement by the bimetal 21, rotation of the nut 17 will continue in the same direction and further rearward movement thereof will result. The nut 17 will force the fan support member rearwardly so that the surface 31′ thereof will engage the surface 10 on the support member 9. (As previously indicated a belleville spring may be disposed between those surfaces; if such a spring is utilized, surface 31′ will compress the spring between surfaces 10 and 31′ to effect a cushioned engagement.) When this occurs, it will be seen that the fan support member 31 is clamped between the surface 10 on the fan support member 9 and the surface 17′ on nut 17 so that the member 31 is mechanically connected to—and will rotate with—the fan support member 9.

As previously indicated, the fan blade assembly 35 has a rotational movement permitted to it, relative to the support member 31, determined by the length of the slots 38. As a result, when the support member 31 begins to rotate with the support member 9 and the pump shaft 1, the relative position of the studs 39 in the slots 38 will move from that indicated in dotted lines in Figure 1 to that indicated in full lines in that figure. The studs 39 will then ensure common rotation of the fan blades 35 with their support member 31. In this condition of the device, all of the parts are "locked up" and rotate together so that there are no parts moving relative to the other parts. As a result, wear is eliminated and the fan operates in substantially the same way as it does in conventional automotive vehicles.

When the rotative speed of the shaft 1 rapidly decreases, as when the accelerator of the vehicle is released rapidly, the momentum of the fan blade assembly 35 will cause it to attempt to continue rotation at the previous high speed of shaft 1, the fan blade assembly 35, therefore, will be rotating faster than the shaft 1 and the support member 9. As a result, the fan blade assembly 35 will rotate relative to the support member 9 and the fan support member 31 to the degree permitted by the slots 38; in other words, the fan blades will rotate relative to the support member until the studs 39 once again occupy the relative position in the slots 38 indicated by the dotted lines in Figure 1. The fan blades 35 will in that instant effect a substantial impact upon the studs 39 which will be transmitted to the fan support member 31 to effect clockwise rotation thereof. Inasmuch as the fan support member 31 and the nut 17 are in frictional engagement at this time, nut 17 is moved in a clockwise direction with respect to the support member 9 so that the nut 17 tends to move away from the fan support member 31 and effect its release. If the bimetal 21 is at this time still hot, nut 17 will immediately be returned to its frictional engagement position with the fan support member 31; when the shaft 1 again overspeeds the fan, as previously described, the fan will once again be "locked up" so as to rotate with the shaft 1.

It should be noted that the bimetal 21 will not have enough strength in and of itself to move the nut 17 away from the fan support member 31 during this "locked up" condition of the device because of the self-locking effect of the frictional engagement between nut 17 and the fan support member 31. However, if the bimetal 21 is sufficiently cool and the shaft 1 speed decreases rapidly, when the fan blade assembly 35 strikes the studs 39 to effect rotation of the fan support member 31, as previously described, in the direction to effect movement of the nut 17 forwardly, as the nut 17 begins this forward movement the bimetal 21 will continue this movement to the end that frictional engagement between the nut 17 and the fan support member 31 is broken and not reestablished. As a result, the normal condition of the device as previously described will obtain, and the fan support member 31 and the fan blades 35 will be released from their "locked up" connection with the shaft 1 and will "windmill" and no longer absorb any more than an insignificant amount of power from the engine.

It will be obvious of those skilled in the art that the operating temperature at which the nut 17 is moved into engagement with the fan support member 31 may be varied by changing the initial tension of the bimetal 21. As previously indicated, this is accomplished in the present invention by the stud 23 and its positioning within the slot 28. If the operating temperature of the device is to be increased or decreased, it is only necessary to loosen the stud 23 from its normal tight position of frictional engagement with the cup 24. When the stud 23 is loosened, it may be positioned as desired within the slot 28 and movement of the stud 23 will of course effect movement of the end of bimetal 21 in which the stud 23 is threaded. When the stud 23 is once again retightened so that the head portion thereof and the associated end of the bimetal are once again in tight frictional engagement with cup 24, the device will operate in the manner aforedescribed. It should be noted that this change in operating temperature may be effected very readily without modifying any of the elements of the device or effecting their disassembly. If desired, suitable indicia may be provided on the cup 24 indicating the direction in which the stud 23 is to be moved to either increase or decrease the operating temperature of the device.

Turning now to a consideration of the embodiment of the invention illustrated in Figures 4 and 5, there is a pump shaft 101 suitably journaled by bearings 102 in a fixed member in conventional fashion. Fixedly mounted upon the pump shaft 101 is a pulley 103 driven by an engine driven fan belt 104, the fan belt effecting common rotation of the pulley 103 and the pump shaft 101. The front portion of the pulley 103 is provided with a radially extending surface 105.

The front portion of the pump shaft 101 is keyed at 106 to a stud 107 which rotates with the shaft 101. The outer periphery of the stud 107 is provided with acme threads 108 which cooperate with threads 109 on a nut 111 which is rotatable upon the stud 107 and consequently longitudinally movable with respect to the shaft 101. The threads 108 and 109 are left handed and are of the "self locking" variety.

The outer periphery of the nut 111 has attached thereto by suitable means, such as a rivet, one end of a spirally wound bimetal 112, the opposite end of which is attached to a stud 113 by means of a generally U-shaped clip 114. The stud 113 and clip 114 attach the associated end of the bimetal 112 to one portion of a cup shaped member 115 also keyed to the shaft 101 for rotation therewith. A stud 116 extends into a suitable threaded opening in the outer end of the pump shaft 101 to hold the cup 115, the stud 107, and the nut 111 in position on the shaft 101. As a result, and as a result of the connection of these elements previously described, they all rotate together with the pump shaft 101 at all times. As best illustrated in Figure 4, the upper portion of the cup 115 is provided with an elongated slot 117 so that the initial tensioning on the bimetal 112 may be adjusted, as previously described, by moving the stud 113 to a desired position within the slot 117. The front face of the cup 115 is provided with a plurality of windows 118 formed by scoops 119 sheared from the front face of the cup, the scoops directing heated air which passes through a vehicle radiator 120 into the interior of the cup 115 and into engagement with the bimetal 112.

Rotatably supported on the shaft 101 by suitable bearings is a fan support member 121 having a rear, radially extending face 122 and a front, radially extending friction face 123. (If desired, a belleville spring may be disposed upon shaft 101 adjacent face 122 and surface 105.) As best illustrated in Figure 5, the surface 122 is adapted for engagement with the surface 105 on the pulley 103 while the surface 123 is adapted to engage a radially extending friction surface 124 forming the rear portion of the nut 111. The fan support member 121 carries a fan blade assembly 125 comprising a pair of crossed fan blade members. The fan blade assembly 125 has a circular aperture centrally located therein which fits over a forwardly extending annular portion 126 on the support member 121. The fan blade assembly 125 has welded to the rear face thereof an annular member 127, the fan blade assembly 125 and the annular member 127 having registering openings 128 extending therethrough. Through each of these openings 128 extends a bolt 129, the opposite end of which is received in a threaded aperture 131 in the fan support member 121. As illustrated in Figures 4 and 5, the bolts 129 permit rotation of the fan blade assembly 125 relative to the fan support member 121 to a degree defined by the circumferentially facing ends of the slots 128.

The operation of the device of the present invention illustrated in Figures 4 and 5 will be readily apparent to those skilled in the art, this operation being substantially identical with the previously described operation of the device illustrated in Figures 1 through 3.

The mechanism for effecting adjustment of the initial bimetal tension in Figures 4 and 5 is such that it is unnecessary to provide a threaded opening in the end of bimetal 112. This opening through the end of the bimetal 112 need only be sufficiently large to permit the stem of stud 113 to pass therethrough; the underside of the head of stud 113 then engages the uppermost surface of the U-shaped clip 114, while the opposite end of the stud 113 is threadably engaged in a suitable threaded aperture in the opposite leg of the U-shaped clip 114.

The aforedescribed embodiments of the present invention are useful in substantially all of the present day automotive vehicles of the passenger car type, whether such vehicles are manually shifted, employ fluid couplings, or employ torque converters. The embodiment of the present invention illustrated in Figures 6 and 7 is particularly suitable, however, in automotive vehicles in which the speed of the engine changes relatively rapidly; such conditions prevail in automobiles, for example, having manually shiftable means or fluid couplings. In this embodiment there is illustrated the pump shaft 1, previously described, suitably journalled by the bearing means 2 in the fixed means 3. There is further provided pulley means 204 driven by the conventional fan belt 5, the pulley means 204 comprising an integral cup member 6 having the radially inwardly extending, circular portion 7, as previously described with respect to the embodiment shown in Figure 2. The portion 7 is provided with a plurality of circumferentially spaced openings 8.

The inner surface of the portion 7 defines a generally circular opening through which extends a support member 209 of cast iron, a phenolic resin, or other suitable material. The support member 209 has a central circular portion with a forwardly facing, radially extending surface 210. The member 209 is further provided with a plurality of outwardly projecting arms 211, disposed inwardly of the aforementioned circular opening defined by the inner surface of portion 7. The arms 211 are provided with a plurality of suitable, threaded openings 212 therein which respectively register with the openings 8 in the portion 7. Suitable studs 213 respectively extend through the openings 8 and threadably engaged with the openings 212 so as to fix the member 209 to the portion 7.

The support member 209 includes a forwardly projecting portion 214 having an opening 215 extending therethrough. The opening 215 is divided into sections of different diameters, the innermost of which is circular and is press fit onto the end of pump shaft 1, the innermost end of the pump shaft abutting an internal wall defining the outer end of this innermost portion of the opening 215. The forward portion of opening 215 may be threaded to receive a suitable threaded stud.

As a result of the aforementioned construction, the support member 209 and the pulley member 204 are fixed together; the support member 209, in addition, is fixed to the outer end of the pump shaft 1. It will therefore be seen that when the vehicle engine operates to drive the fan belt 5, the pulley member 204, the support member 209, and pump shaft 1 will rotate together.

The outermost end of support member 209 is provided with a plurality of integral external screw threads 216 which preferably are acme stud threads of three per inch.

Mounted upon the outer end of the support member 209 there is a nut 217 of steel, phenolic resin or other suitable material having threads 218, complementary to— and associated with—the threads 216 on the support member 209. The threads 216 and 218 are constructed and arranged to be "left-hand" threads, and preferably are self-locking. The nut 217 is circular in outer configuration, and has a rearwardly facing, radially extending friction face 217'.

To the nut 217 is fixedly attached, by means of a rivet 219, one end of a spirally wound bimetal 221. The opposite end of the bimetal 221 is provided with an opening 222; co-operating with this opening is a stud 223 which carries a nut 224. The stud 223 and the nut 224 serve to fix the bimetal 221 to the before described cup shaped member 24. The cup shaped member 24 is keyed to the outer end of the support member 209 in the same way as before described with respect to the cup 24, and the support member 9 of Figure 1. The initial tension of the bimetal 221 may be varied by moving the stud 223 in the slot 28 provided in the cup 24, as previously described.

Carried by the support member 209 is a fan support member 231 rotatably mounted upon the support member 209 by means of suitable bearings 232. The member 231 has a forwardly facing, radially extending friction surface 234, radially outwardly of which is an annular recessed surface 235 which extends radially outwardly and against which is disposed the rear face of a fan blade assembly 236, comprising a pair of crossed fan blades.

Fan blade assembly 236 is provided with a plurality of spaced openings 237 which respectively register with a plurality of spaced threaded openings 238 in the fan support member 231. A stud 239 projects through each of the openings 237, and is in threaded engagement with the threaded portion of the opening 238 associated therewith, so as to hold the fan blade assembly 236 on the fan support member 231. The dimension of stud 239 is such as to fill the associated opening 237 so that no relative motion between the fan blade assembly 236 and the fan support member 231 may occur. Keyed to the rear surface of the fan support member 231 by cooperating non-circular surfaces is a belleville spring 241 which is generally circular. The spring 241 has a central, non-circular opening therein which receives a milled keyway on the rear surface of the fan support member 231; the spring 241 has lugs 242 extending rearwardly of the spring 241 and into cooperating openings 243 formed in a thrust washer 244. The thrust washer 244 is generally circular in configuration and is formed of bronze or any other similar suitable material; the central portion of the washer 244 is provided with a circular opening which rotatably seats upon a circular seat 245 formed on the support member 209.

As a result of this arrangement it will be seen that the fan blade assembly 236 will rotate with the fan support member 231; the belleville spring 241 will also turn with the fan support member 231, and the thrust washer 244 will rotate with the belleville spring 241 in view of the cooperation between the lugs 242 and the openings 243.

When the device is disposed in an automobile it is aligned with, and immediately behind, the rear face of the vehicle radiator, indicated by the numeral 246 in Figure 6. When the vehicle engine is operated, the fan belt 5 will be continually driven so as to effect constant, common rotation of the pulley 204, support member 209, the pump shaft 1, cup 24 and nut 217. This rotation will conventionally be clockwise when viewed from the front, or the right side as illustrated in Figure 6. In the condition of the device illustrated in Figure 6, the fan support 231 and the fan blade assembly 236, will rotate in the same direction as member 209 because of the slight bearing drag between the support member 209 and the fan support member 231; when the vehicle is moving forwardly (toward the right in Figure 6) the fan support member 231 and the fan blade assembly 236 will also tend to rotate in the clockwise direction, because the pitch of the fan blades is such that as air moves rearwardly past these blades, clockwise motion thereof is induced. The fan support member 231 and the fan blade assembly 236 are, however, merely "wind-milling."

When the temperature of the air surrounding the device is sufficiently increased, for example when heated air passes rearwardly from the radiator 246, and the temperature of bimetal 121 is increased sufficiently, it will force rotation of the nut 217 in a counterclockwise direction to effect rearward movement thereof. Upon sufficient rearward movement of the nut 217, the rear friction face 217' thereon will engage the forwardly facing friction surface 234 of the fan support member 231. Inasmuch as the fan support member 231 is rotating more slowly than the nut 217, when this engagement occurs, rotation of the nut 217 will be forced to continue in the same direction, and further rearward movement thereof will result. The nut 217 will force the fan support member 231 rearwardly against the bias of the belleville spring 241 until the member 231 is fixedly clamped in a "sandwich" comprising the thrust washer 244, the spring 241, the fan support member 231 and the nut 217 so that this entire assembly rotates together. In other words, all of these elements will rotate together, and at the same speed as the pulley means 204 and pump shaft 1. The device then operates substantially as the fans in present day vehicles.

With the device in this "locked up" condition, when the relative speed of the pulley means 204 rapidly decreases, as when the accelerator of the vehicle is released rapidly, the momentum of the fan blade assembly 236 will cause it to attempt to continue rotation at its previous high speed. The fan blade assembly 236, and the fan support member 231 attached thereto, will therefore be rotating faster then the pulley means 209. As a result, the nut 217—in frictional engagement at this instance with the fan support member 231—will be rotated toward its position illustrated in Figure 6. In other words, nut 217 will be moved toward its "unlocked" position. If the bimetal 221 is still hot at this time, nut 217 will immediately be returned to its position of frictional engagement with the fan support member 231; the structure will once again, therefore, be "locked up" when the pulley means 204 once again overspeeds the fan support member 231.

As previously noted, the bimetal 221 will not of itself have sufficient strength to move nut 217 out of engagement with fan support member 231 because of the self-locking effect of the frictional engagement between nut 217 and support member 231. However, if bimetal 221 is sufficiently cool, when the support member 231 overspeeds the pulley member 204, as the nut 217 begins to move away from support member 231, bimetal 221 will continue this movement. The parts will then assume the position illustrated in Figure 6 and the support member 231 with the fan assembly 236 will once again "windmill." It should also be noted that if bimetal 221 should break, nut 217 will drift rearwardly into engagement with support member 231 so that the device will remain in its "locked-up" condition.

The initial tension of bimetal 221 may be varied by loosening nut 224 on stud 233, and sliding stud 223 in the appropriate direction within the accurate slot 28 formed in cup 24. Upon tightening of the nut 224, the bimetal 221 will operate with modified characteristics, as will be obvious to those skilled in the art.

It will therefore be seen that the device of the present invention permits desired, controlled operation of the fan with certainty and yet at a minimum expense. It should be noted that, particularly with respect to the preferred forms of the invention as illustrated in Figures 1 through 3, and in Figures 6 and 7, that the pump shaft of the vehicle as used in present day automotive vehicles need not be modified at all to accommodate the device of this invention. In distinction, the device of the present invention, particularly in the form illustrated in those figures may be constructed as a unit assembly—comprising the pulley with support member 9 and the elements supported thereby—and readily attached to the pump shaft employed in conventional automotive vehicles in exactly the same manner as now employed to effect the installation of the conventional fan assembly. When so attached the device is ready for immediate operation. In addition is should also be noted that in view of the self-locking arrangement of the screw threads employed in all forms of the device described, the nut 17 of Figure 1 (or the comparable mechanism in the other embodiments) will move rearwardly to lock up the fan and keep it operating even if the bimetals should break. This is a "fail safe" arrangement, and under those conditions the fan would be continuously operated until the device was repaired. It is also important to notice that the arrangement of the parts is such that the temperature at which the fan is to be "locked up" may be varied by a very simple mechanism which is readily accessible, no special tools to effect this adjustment being required.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a control system, the combination comprising rotatable drive means, driven means co-axially disposed in relation to said drive means normally rotatable relative thereto, means to clamp said driven means to said drive means comprising a pair of relatively rotatable camming members one of which is adapted to engage said driven means and effect the aforementioned clamping action, thermally responsive means carried by said drive means constructed and arranged to effect relative rotation between said camming members and effect engagement of said one camming member with said driven means, and means constructed and arranged to vary the temperature at which said thermally responsive means operate.

2. The device defined in claim 1 in which said thermally responsive means comprise a bimetallic member and in which said means to vary the temperature at which said thermally responsive means operate comprises means to change the position of one portion of said bimetallic member.

3. In a fan control system, the combination comprising pulley means adapted to be rotatably driven, first threaded means rotatable with said pulley means, second threaded means mounted upon said first threaded means for rotational and longitudinal movement relative thereto, fan support means disposed between a surface on said pulley means and a surface on one of said threaded means, a fan blade assembly carried by said fan support means, means defining openings extending through said fan blade assembly, stud means extending through said openings fixedly mounted to said fan support means having portions within said openings smaller than said openings whereby limited rotational movement of said fan blade assembly relative to said fan support means is permitted, and bimetallic means to effect relative rotation between said first and second threaded means constructed and arranged to effect engagement between said one surface on one of said threaded means and said fan support means to effect clamping of said fan support means between said one surface on one of said threaded means and said pulley means surface whereby to effect common rotation of said pulley means and said fan blade assembly.

4. The device defined in claim 3 in which said first threaded means is formed as an integral extension of said pulley means.

5. The device defined in claim 3 in which said bimetallic means comprises a spirally wound bimetal, and in which means are provided to change the initial tension of said spirally wound bimetal.

6. The device defined in claim 3 in which said pulley means is provided with an extension, said fan support means being carried by said extension, and in which said first threaded means is formed as an integral part of said extension.

7. In a fan control system, the combination of pulley means adapted to be rotatably driven, extension means carried by said pulley means, first threaded means formed on said extension means, second threaded means mounted upon said first threaded means for rotational and longitudinal movement relative thereto, fan support means disposed upon said extension means between a surface of said pulley means and a surface on one of said threaded means and normally rotatable relative to said extension means, a fan blade assembly carried by said fan support means, means defining a plurality of curved openings extending through said fan blade assembly, stud means extending through said openings fixedly mounted to said fan support means having portions within said openings smaller than said openings whereby limited rotation of said fan blade assembly relative to said fan support means is permitted, and thermally responsive means to effect relative rotation between said first and second threaded means constructed and arranged to effect engagement between said one surface on one of said threaded means and said fan support means to effect clamping of said fan support means between said one surface on one of said threaded means and said pulley surface whereby to effect common rotation of said driven pulley and said fan blade assembly.

8. The device defined in claim 7 in which said thermally responsive means comprises a spirally wound bimetal and in which means are provided to vary the initial tension of said spirally wound bimetal.

9. In a fan control system, the combination of pulley means adapted to be rotatably driven, extension means supported by said pulley means, first threaded means formed on said extension means, second threaded means mounted in engagement with said first threaded means for rotational and longitudinal movement relative thereto, fan support means disposed upon said extension means between a surface on said pulley means and a surface on one of said threaded means and normally rotatable relative to said extension means, a fan blade assembly fixedly mounted to said fan support means, and thermally responsive means to effect relative rotation between said first and second threaded means constructed and arranged to effect engagement between said surface on one of said threaded means and said fan support means to effect clamping of said fan support means between said surface on one of said threaded means and said surface on said pulley means whereby to effect common rotation of said pulley means and said fan blade assembly.

10. Fan control means comprising rotatable drive means, extension means supported by said drive means for rotation therewith, first threaded means formed on said extension means, driven means supported upon said extension means and normally rotatable relative thereto, second threaded means in engagement with said first threaded means and movable relative thereto to a first position in engagement with said driven means to effect the connection of said driven means to said drive means and to a second position spaced from said driven means to disconnect said driven means from said drive means, said driven means being constructed and arranged to effect movement of said second threaded means toward said first position upon initial engagement between said driven means and said second threaded member, and thermally responsive means to effect said initial engagement between said driven means and said second threaded member.

11. The device defined in claim 10 in which said driven means comprise fan support means and fan blade assembly means mounted thereon for rotation therewith.

12. The device defined in claim 10 in which said driven means comprise fan support means and fan blade assembly means mounted thereon, and in which said fan blade assembly means are provided with elongated slots through which fastener means extend to provide a lost motion connection between said fan blade assembly means and said fan support means.

13. The device defined in claim 10 in which said thermally responsive means comprise bimetallic means, and in which means are provided to vary the operating characteristics of said thermally responsive means.

14. Fan control mechanism comprising rotatable drive means, extension means supported by said drive means for rotation therewith, first threaded means integrally formed on said extension means, driven means supported upon said extension means and normally rotatable relative thereto, second threaded means in engagement with said first threaded means and movable relative thereto to a first position in engagement with said driven means to effect the connection of said driven means to said drive means and to a second position spaced from said driven means to disconnect said driven means from said drive means, said driven means being constructed and arranged to effect movement of said second threaded means toward said first position upon initial engagement between said driven means and said second threaded member, a generally cup-shaped member carried by said extension means for rotation therewith, thermally responsive means, means connecting said thermally responsive means to said cup-shaped member, means connecting said thermally responsive means to said second threaded member, said thermally responsive means being constructed and arranged to rotate said second threaded member relative to said first threaded member to effect said initial engagement between said driven means and said second threaded member, said means connecting said thermally responsive means to said cup shaped member being constructed and arranged to effect changes in the operating characteristics of said thermally responsive means.

15. The device defined in claim 14 in which said extension means are formed of phenolic resin material, and in which said thermally responsive means comprise a spirally wound bimetallic member.

16. The device defined in claim 14 in which said driven means are disposed upon said extension means intermediate said first threaded means and said drive means, and in which resilient means are disposed between said driven means and said drive means.

References Cited in the file of this patent

UNITED STATES PATENTS

| | | |
|---|---|---|
| 936,190 | Tuckfield | Oct. 5, 1909 |
| 1,598,677 | Donning | Sept. 7, 1926 |
| 1,770,419 | McGrath | July 15, 1930 |
| 1,940,090 | Hetherington | Dec. 19, 1933 |
| 2,005,468 | Modine | June 18, 1935 |
| 2,381,567 | Bonham | Aug. 7, 1945 |
| 2,459,377 | Hallinan | Jan. 18, 1949 |
| 2,603,420 | Tacchi | July 15, 1952 |
| 2,740,388 | Bennorth | Apr. 3, 1956 |

FOREIGN PATENTS

| | | |
|---|---|---|
| 163,440 | Great Britain | May 13, 1921 |
| 593,596 | Germany | Mar. 6, 1934 |
| 831,712 | France | June 13, 1935 |